(12) United States Patent
Turner (10) Patent No.: US 6,906,725 B2
(45) Date of Patent: Jun. 14, 2005

(54) APPARATUS AND METHOD FOR SIMULATING SENSOR IMAGERY

(75) Inventor: James A. Turner, Binghamton, NY (US)

(73) Assignee: L-3 Communications Corporation, New York, NY (US)

( * ) Notice: Subject to any disclaimer, the term of this patent is extended or adjusted under 35 U.S.C. 154(b) by 105 days.

(21) Appl. No.: 10/080,911

(22) Filed: Feb. 22, 2002

(65) Prior Publication Data

US 2005/0078121 A1 Apr. 14, 2005

(51) Int. Cl.[7] ................................................ G09G 5/02
(52) U.S. Cl. ...................... 345/589; 345/600; 345/605; 345/698; 345/699
(58) Field of Search ................................ 345/589, 600, 345/605, 698–699, 204; 348/33–34, 121, 164

(56) References Cited

U.S. PATENT DOCUMENTS

| | | |
|---|---|---|
| 3,742,124 A | 6/1973 | Wilson et al. |
| 3,746,778 A | 7/1973 | Peters |
| 3,748,374 A | 7/1973 | Curran et al. |
| 3,769,458 A | 10/1973 | Driskell |
| 3,786,269 A * | 1/1974 | Cooper ........................ 250/334 |
| 3,949,490 A | 4/1976 | Derderian et al. |
| 4,016,658 A | 4/1977 | Porter et al. |
| 4,149,185 A | 4/1979 | Weinger |
| 4,152,766 A | 5/1979 | Osofsky et al. |
| 4,232,456 A | 11/1980 | Harmon et al. |
| 4,512,745 A | 4/1985 | Mohon et al. |
| 4,526,545 A | 7/1985 | Mohon et al. |
| 4,683,496 A | 7/1987 | Tom |
| 4,751,571 A | 6/1988 | Lillquist |
| 4,853,784 A | 8/1989 | Abt et al. |
| 5,140,532 A * | 8/1992 | Beckwith et al. ............ 358/1.1 |
| 5,144,149 A | 9/1992 | Frosch |
| 5,224,860 A | 7/1993 | Waldman et al. |
| 5,280,357 A | 1/1994 | Desjardins |
| 5,315,390 A | 5/1994 | Windrem |
| 5,317,689 A * | 5/1994 | Nack et al. .................. 345/505 |

(Continued)

FOREIGN PATENT DOCUMENTS

GB 2152322 A 11/1983

Primary Examiner—Matthew C. Bella
Assistant Examiner—Po-Wei Chen
(74) Attorney, Agent, or Firm—Tiajoloff & Kelly (57) ABSTRACT

The present invention provides a simulation for displaying a screen formulated from data, such as a FLIR sensor, relying on color definitions that are more readily supported by common image generators, most preferably 8-bit per channel RGB color processing and video output. The system has an image generator that transmits a video signal of at least two digital data channels, and a display system with a combiner circuit and a visual display device. The bit sets of the channels each represent a respective value of the data variable at a resolution for that channel, and the bit sets of the second channel each represent a respective value of the data variable at a second resolution higher than the resolution of the first channel. Combiner circuitry receives the channels of video output and processes these channels to select the channel which represents the accurate data unaffected by clamping. It is preferred to provide at least three channels of pixel data representing the value of the display data, in three different resolutions and ranges, high resolution; middle resolution and low resolution. In the preferred embodiment, the data displayed on the display device are simulated FLIR infra-red intensities, which correlate to the temperatures of the simulated objects being viewed. Preferably, the ranges of different resolution IR data encompass the ambient temperature being simulated, because attenuation of infra-red in reality tends to compress all detected infra-red temperatures to a narrow field around ambient temperature.

47 Claims, 4 Drawing Sheets

U.S. PATENT DOCUMENTS

| | | |
|---|---|---|
| 5,320,534 A | 6/1994 | Thomas |
| 5,432,528 A | 7/1995 | Ritter |
| 5,448,302 A | 9/1995 | DesJardins |
| 5,630,718 A | 5/1997 | Montag et al. |
| 5,640,468 A * | 6/1997 | Hsu .......................... 382/190 |
| 5,739,868 A | 4/1998 | Butler et al. |
| 5,745,173 A | 4/1998 | Edwards et al. |
| 6,154,252 A * | 11/2000 | Tanaka ..................... 348/164 |
| 6,196,845 B1 | 3/2001 | Streid |
| 6,255,650 B1 * | 7/2001 | Warner et al. ............ 250/330 |
| 6,529,331 B2 * | 3/2003 | Massof et al. ............ 359/630 |

\* cited by examiner

APPARATUS AND METHOD FOR SIMULATING SENSOR IMAGERY

FIELD OF THE INVENTION

This invention relates to systems and methods for simulation of imagery for displays for sensor outputs, and especially to the simulation of imagery for displays such as Forward Looking Infra Red (FLIR) viewing systems, and other systems with similar displays, e.g., night-vision systems. Simulations of such systems are often applied as part of larger simulator systems for vehicles, especially simulator systems for military aircraft.

BACKGROUND OF THE INVENTION

In real FLIR systems, an infrared sensor or detector scans a field of view and produces from this scanning a video image that displays to the user the amount of detected radiation. Generally, the FLIR display is monochrome and the intensity of the monochrome display at each point of its field of view is a function of the temperature and surface characteristics of the object viewed at that point, the distance of the object from the sensor and atmospheric absorption characteristics, with white either representing hot or cold, at the election of the designer or user, and black representing the opposite. Alternatively, the FLIR output can be color video, wherein the color of each point of the display is a function of the temperature of the object viewed at that point. In either case, however, the video output to the viewer is dependent upon the detected radiation, which is indicative of the temperature of the object emitting it. The raw output of the infrared sensor of a real FLIR is normally AC coupled, either based on the frame or line of the display, and is displayed as video on a monitor, such as a CRT screen, or via another display device, such as a head mounted display projecting the image to the eye of the user, or a head-up display.

Depending on the conditions and the temperatures of objects viewed with the FLIR, the detected radiation may indicate temperatures that range over more than a thousand or over only a few degrees Celsius. Generally, the temperatures seen in a FLIR are attenuated by the distance from the sensor to the object and the atmospheric conditions, especially humidity, and, where there is attenuation, the range of temperatures detected by the sensor is compressed toward the temperature of the ambient atmosphere. This means, for example, that an object with a temperature of 40° C. viewed at a distance in air with a temperature of 20° C. might appear in a real FLIR to have a temperature of only 30° C. or even as little as 20.1° C. or less, depending on visibility or atmospheric conditions.

To display the FLIR sensor view to the user, the AC-coupled sensor output is subjected to an adjustable gain that varies the resolution of the temperatures displayed. When the gain is turned down, the range of temperatures represented by the range of monochrome shades of gray from white to black is relatively large, e.g., hundreds of degrees. This wide temperature range means that there is low temperature resolution, i.e., that temperatures a few degrees apart are all displayed as about the same monochrome shade of grey, making it difficult to distinguish between objects whose radiant energies are relatively close to each other. This is especially a problem where there is IR attenuation due to low visibility, high humidity, rain soaking, etc., and all objects tend to appear in infrared to be within a few degrees of ambient.

To overcome this, in real FLIR systems, the user can increase gain by a manual control, or an automatic gain control (AGC) may be provided so that the best level of viewability is provided on the display. When the user (or the AGC) increases gain, the range of temperatures displayed between white and black is attenuated to a narrower range, usually centered on the ambient temperature. Temperatures outside this range are displayed as either black or white, depending on whether they are hotter or colder than the operative temperature range, an effect referred to as "clamping", but temperatures within the range are in higher temperature resolution and more readily distinguishable from each other, because an equivalent difference in the monochrome gray shade signifies a smaller temperature difference at the higher gain.

Simulation of such a display presents substantial difficulties due mainly to the difference between the AC coupled IR sensor data compared with normal video produced by image generators (IGs) generally used in simulators. Image generators used in aircraft or vehicle simulators generally are directed to creating imagery, like out-the-window scenes, that are simply to be viewed by a user as realistic imagery without added processing. IGs therefore generally do their calculations using variables of limited bit-size adequate to make common video imagery, and they calculate the color and shade of imagery and normally generate video output using 3×8-bit color values (8 bits for each of the red, blue and green color channels for each pixel) which is adequate color differentiation for realistic imagery that is projected for human viewing. This format is somewhat limiting in terms of output of a monochrome image, however, since, with 3×8-bit video output, the video output of the image generator is limited to 255 shades of gray.

This form of output is especially dissimilar to the AC-coupled output of a real FLIR sensor when it comes to the application of gain. A real FLIR output, on increase of gain, has a full range of gray scale values, and fine differences between temperatures near ambient are magnified as gain is turned up, yielding a higher resolution display. In contrast, in a 3×8-bit pixel video output, an increase in gain would only produce a reduction in the number of shades of gray, with clamping of the temperatures outside the narrowed range, and there could be no higher resolution of close temperature differences, because that information is not present in the video output.

Some prior art systems have tried to provide higher resolution of the simulated FLIR output by using larger numbers of bits in the internal processing of the imagery and in the output video. These systems theoretically provide adequate output to satisfy the necessary dynamic range of the FLIR display. However, calculation with this larger number of bits comes at a cost premium, and the requirement of color calculation with larger bit sizes greatly restricts the choices as to which of the available image generators can be used in the simulation.

SUMMARY OF THE INVENTION

It is therefore an object of the present invention to provide for simulation of systems for displaying a screen formulated from data, such as a FLIR sensor, while relying on color definitions that are more readily supported by common image generators, most preferably 8-bit per channel RGB color processing and video output.

According to the invention, a system is provided for simulating a display of a data variable over the pixels of a field of view. The system has an image generator with an output that transmits a video signal of at least two digital data channels. The system also includes a display system connected with the output of the image generator that receives the at least two digital data channels. The display system includes a combiner circuit receiving and processing the data channels and a visual display device that displays a field of pixels that can be viewed by the user. The visual display device is connected with the combiner circuit and displays video imagery derived from the data channels in the field of pixels for viewing by a user.

The digital data channels of the video signal from the image generator each have a number of bit sets therein. Each bit set corresponds to a respective pixel of the display device and has a preset number of bits of digital data. The bit sets of the first channel each represent a respective value of the data variable at a first resolution, and the bit sets of the second channel each represent a respective value of the data variable at a second resolution higher than the resolution of the first channel.

In the preferred embodiment, the simulation is of a FLIR system and the data displayed on the display device is detected infra-red intensities, which correlate to the radiation of the objects received by the FLIR sensors.

It is also preferred to provide three channels at least of pixel data representing the value of the display data, e.g., the FLIR intensity, in three different resolutions and ranges, high resolution (and narrow range of data values); middle resolution (and a moderate range of data values); and low resolution (wide range of values).

Preferably, the ranges of different resolution data are centered on the ambient temperature being simulated, because attenuation of infra-red in reality tends to compress all detected infra-red temperatures to a narrow field around this ambient temperature.

It is also preferable to use the standard red, green and blue channels of a video output from the image generator to carry the three different resolutions of data. Most commonly, these channels provide eight bits for each color per pixel.

In the preferred embodiment, combiner circuitry is a dedicated hardware-specific digital circuit that receives the two or more channels of video output and processes these channels to select the channel that represents the accurate data unaffected by clamping.

It is also an object of the present invention to support a gain control in a simulation that mimics the operation and effects of a gain control in a real system such as a FLIR.

Other objects and advantages of the invention will become apparent to those of skill in the art on review of the present specification.

DETAILED DESCRIPTION

The simulation systems of the present invention are for simulating the display of values of a data variable that is detected over a field of view by sensors or detectors or other similar devices. Examples of such data displays for scanned or detected data variables are systems for providing imagery from non-visible radiation, which is either outside the visible frequencies (such as infrared or ultraviolet light) or below visible intensities (as in night vision systems). Particularly appropriate and benefited by application of the invention, however, are simulations of infrared displays, as will become more apparent herein.

Figure 1:
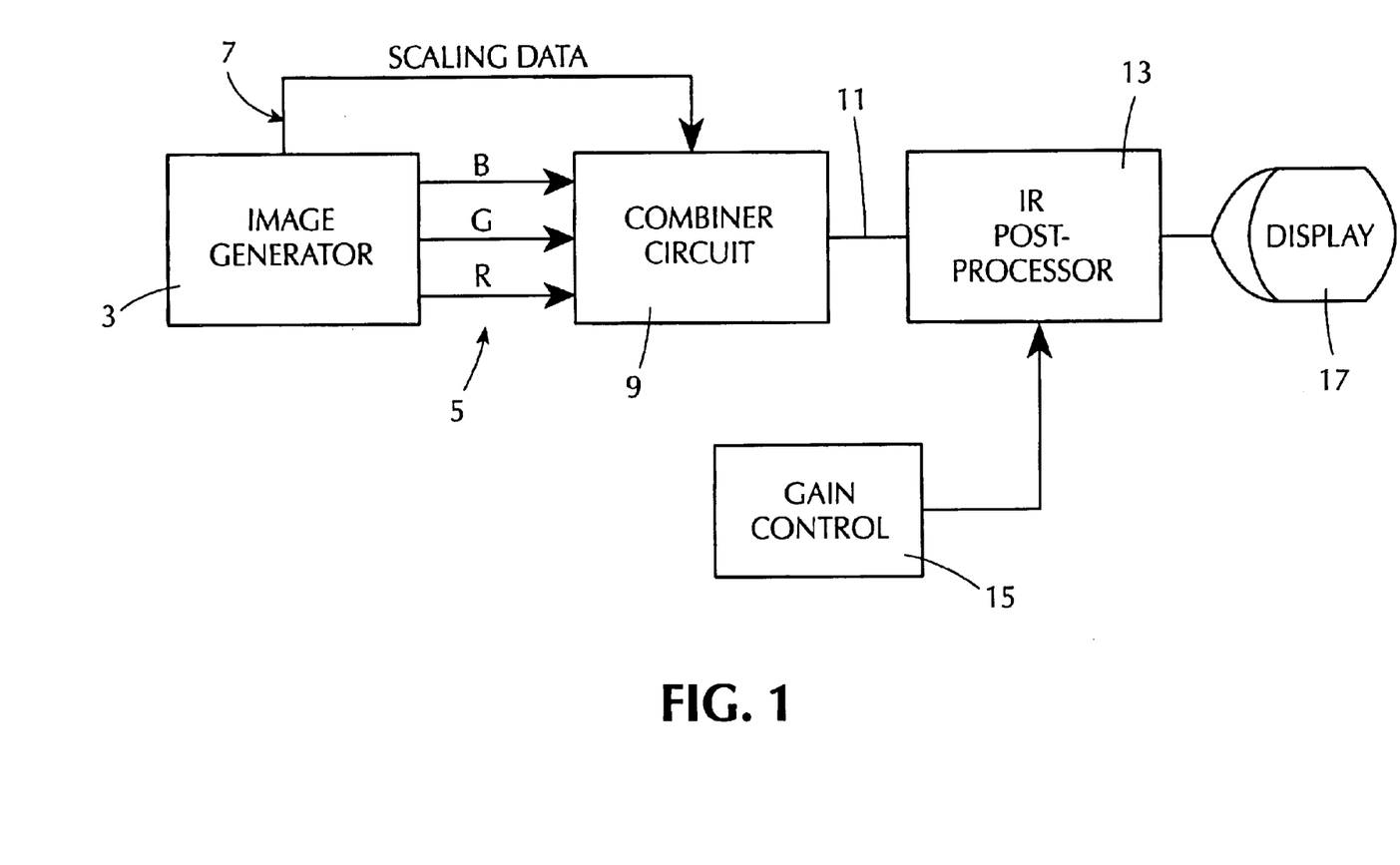
FIG. 1 is a schematic diagram of a simulation system according to the invention.

Referring to FIG. 1 the preferred embodiment of a simulation system of the present invention comprises an image generator 3 with a video output 5 carrying three parallel channels representing the red, green and blue components of the video stream. This video is transmitted, together with scaling data (which will be explained further below) sent on an additional output line 7, to a combiner circuit 9. The combiner circuit 9 is a dedicated digital circuit that receives the three channels of video output and the scaling data, and derives therefrom a scaled output for display that it transmits over line 11 to a post-processor 13, which is also a digital circuit. The post processor 13 receives the scaled output for display and also receives input from a gain control 15 connected therewith.

The gain control 15 is usually a device like a dial or sliding switch that mimics a real gain control that is adapted to be used by an operator to manually control gain in the displayed data. The gain control 15 generates an electrical signal indicative of a desired level of gain or change in gain for the displayed data. The post-processor 13 derives a display signal based on the gain control input and the video output of the image generator, and transmits the display signal to visual display device 17, which displays the digital signal to the user in a field of pixels.

Alternatively, a lower fidelity system may omit the post-processor, and the gain control may connect with the combiner circuitry, which will apply the desired gain to the display output therein, for example, during the scaling process, including, where appropriate, clamping the values outside the range defined by the gain control setting.

It will be understood that the display is preferably a screen or monitor, such as a CRT or flat-panel LCD display, but that any device that displays a pixel field to a viewer, such as a head-mounted display that presents a small image directly to the viewer's eye or a projection system, may also be used for the display device 17.

Together, the combiner circuit 9, the post-processor 13 and the display device 17 constitute a display system for the data output on the video channels of output 5 from the image generator 3.

In the preferred embodiment, the simulation of the invention is used in a vehicle simulator, especially an aircraft simulator, and the image generator 3 is connected with a number of other well-known simulator system components (not shown) that preferably include a simulated cockpit with user-operated flight controls that are connected with the image generator, and a projection or other display system that shows the user out-the-window scene imagery that changes with simulated flight of the aircraft, as well as various other simulated instrument and display outputs that help provide a realistic simulation.

The image generator 3 is a host computer system running software that generates video based on data that defines the attributes of various objects in the scene space of the simulator. Image generators suitable for use with the present invention are widely available, and include image generators or software sold by Evans & Sutherland, Lockheed Martin, or Silicon Graphics, and almost any other PC based image generator.

In the preferred embodiment, the image generator 3 generates out-the-window scene video for the simulation, as well as the output 5 for the data display. The out-the-window scene and any other video outputs beside the data display output 5 are transmitted from the image generator along output lines (not shown) other than output 5, which transmits only the output used in the simulated data display of the present invention.

The signal output along line 5 is in form a video signal. By this it is meant that the signal is transmitted over a video cable as three separate channels, which ordinarily constitute red, green and blue channels of the color video output. As is well known in the art, each of the color channels is a signal containing data that defines sequential screen images of the associated color component of the total video. The data defining each screen image is composed of a number of sets of bits, and each bit-set defines a value of the intensity for the associated color component of the respective pixel on the video screen. In the preferred embodiment, the video format is one of the most common, in which the intensity bit-sets are sets of 8 bits, and wherein the intensity value transmitted by these bits can range from 0 to 255.

Although the video output 5 is in video format with three channels of digital pixel data, the data in the channels is not color intensity values in the usual sense. Rather, the image generator and its software are made to create a digital data video signal by carefully controlling the color data and other parameters of image generation. In the preferred embodiment, the data variable to be simulated is calculated by a process wherein the sensor field of view is generated as a set of pixels, and by ray or beam tracing, or some other method in the rendering arts, the object that is seen by the sensor in each pixel, or location, in the field of view is identified in the scene database. Data about the object is accessed in the scene database, and this information is applied by a mathematical model to derive a value of a data variable for the pixel of the field of view being determined, yielding an array of data variables for pixels of the field of view of the sensor. Where the sensor is a FLIR, the scene database includes for each simulated object a key or pointer that defines for the simulated object being viewed what material it is formed of. This data and any other relevant thermal information, such as ambient temperature, sunlight angle, etc., for the object are used in a thermal mathematical model to determine a value of a data variable for each pixel of the simulated IR sensor field of view, which in the case of a FLIR is a radiant energy value.

The calculated value of the data variable may be a larger data field, such as a floating point variable, but it is immediately scaled and stored in a number of data fields of limited size, preferably 8-bits, that correspond to the associated pixel (or location) of the field of view. The scaling is such that the value of the data variable in the preferred embodiment is stored in high, medium, and low resolutions, as will be clarified below. Together with the data values for the other pixels of the field of view, these data values are passed through respective image generator channels 20 for the respective resolution, wherein the data are modified as necessary to render the data more realistic in the simulation, for example, for various visibility factors or, in the case of a FLIR simulation, fading IR radiance toward ambient temperature where there is attenuation due to atmospheric conditions, distance to the object from the sensor, and any other relevant condition. These image generation channels are basically software-based procedures executed in the computer of the image generator 3, and the data fields are stored in the computer-accessible memory of this system during calculations.

The image generation channels each produce a respective set of scaled values for the data variable stored in limited size data fields that each correspond to a respective location (pixel) of the field of view of the sensor, i.e., a screen of data for the field of view at a preselected resolution. Each data field preferably has no more than 8 bits for the pixel, and each scaled data value of the process ranges from 0 to 255. The data variable values from the three image generation channels 20 are then placed in an output video signal which is output from the image generator.

The resulting output video signal contains values for the data variable for each of the pixels in the video signal, each of which correspond to a respective location in the field of view from which the data variable is to be displayed. The value of the data variable is stored in the different channels, but in each channel at a different resolution, i.e., low, medium and high, meaning that the limited bits of the specific pixel data are set to cover different ranges of values of the data variable.

Figure 2:
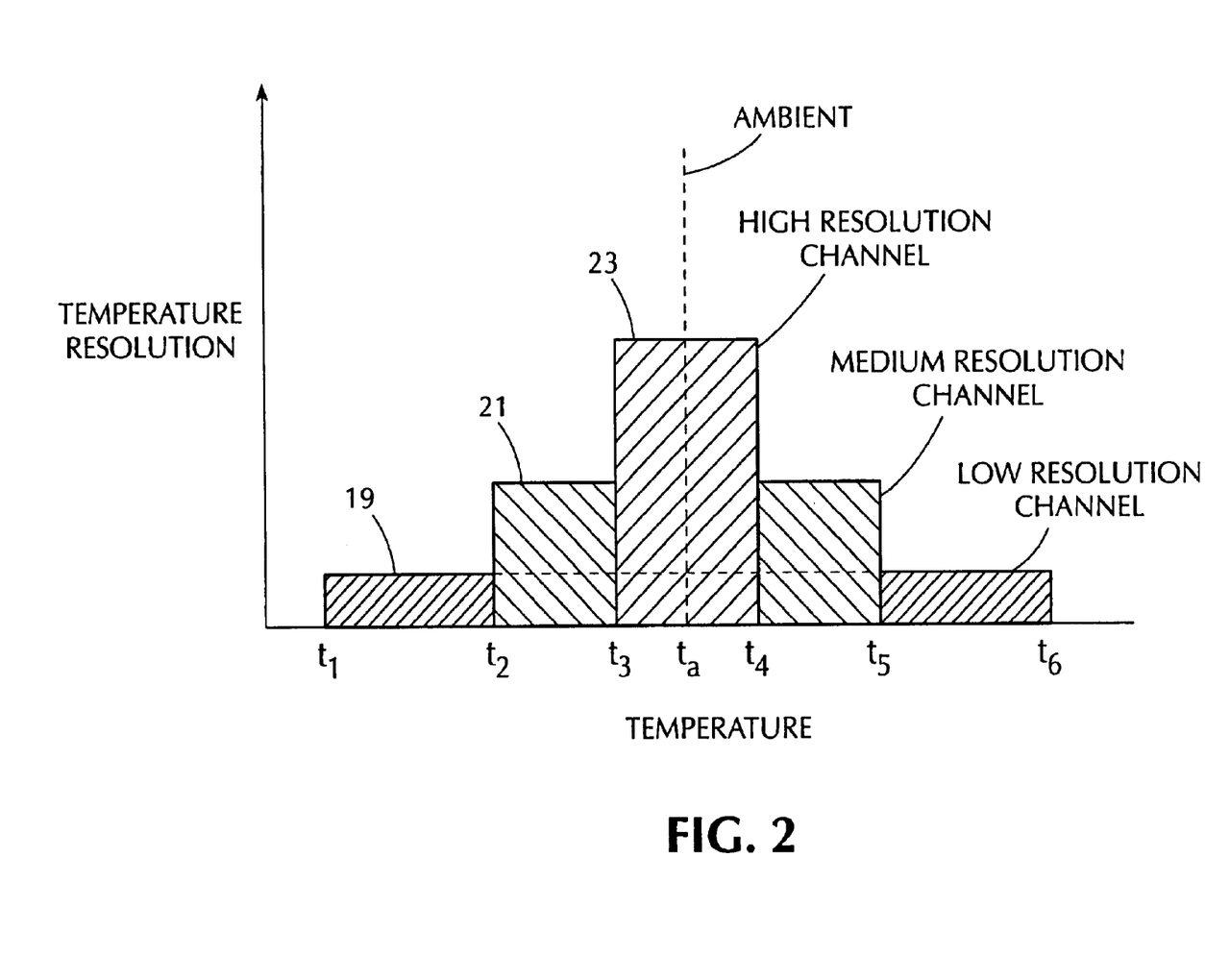
FIG. 2 is a graph illustrating the resolutions and temperature ranges of high, medium and low resolution data channels of the preferred embodiment.

This packaging of data is best illustrated by an example shown graphically in FIG. 2 wherein the simulated data variable being transmitted over the video channels is infrared intensity data for a simulated FLIR-type system. The IR intensity data for the field of view of the simulated FLIR is placed in three channels, a low resolution channel 19, a medium resolution channel 21 and a high resolution channel 23. These are technically color channels, but the data is monochromatic, i.e., a single value per pixel, so which color label (Red, Blue, or Green) is assigned to which individual channel is irrelevant.

Low resolution channel 19 covers data values in a range of IR values (i.e., apparent temperatures for the pixel) that extends from $t_1$ to $t_6$. Because there are only 8 bits in the usual pixel data bit set, the stored number for the temperature defining the value in this range is from 0 to 255. This means that the value of the least significant bit (LSB), i.e., the difference in value made by changing the last bit to a zero or a one, the minimum step in value change, for the data values in this low resolution channel is $(t_6-t_1)/255$. Also, the value 0 in this channel means the lower minimum, i.e., $t_1$ and the value 255 means $t_6$, with intermediate values dividing the range therebetween into increments each of the LSB.

Medium resolution channel 21 covers the range of temperatures from $t_2$ to $t_5$. If, at any time during the image generation channel process, any temperature values in the pixels in the medium resolution channel were less than $t_2$ or greater than $t_5$, those data values "clamp" to values of 0 or 255, respectively. Subsequent calculations are contaminated by this clamping, with the result that correct and exact value of this data is kept only in the lower resolution channel. This is a narrower range of temperatures, so the LSB for each value is a smaller amount than in the low resolution channel $((t_6-t_1)/255<(t_5-t_2)/255)$ and the result is a higher resolution of the exact value of the IR temperature data value. Because the number of bits for each pixel is pre-set (in the present example at 8 bits), an increase in range of temperatures covered necessarily results in a reduction in resolution. If higher resolution is desired, it is at the expense of temperature range coverage, e.g., doubling the resolution will halve the covered temperature range.

The highest resolution channel 23 covers the narrowest range of temperatures, between $t_3$ and $t_4$, and consequently has the highest resolution (accuracy) of data values stored therein, but also the greatest number of clamped values will occur in this channel.

Generally, the ranges of the channels should be around the distribution of the data values so that optimal use is made of the resolution of the range. It may be noted that all three channels in this FLIR example are centered on a single temperature, the ambient temperature $t_2$ that is used to calculate the data for display in the simulation. This is appropriate for FLIR simulation usually only when atmospheric conditions and other factors tend to cause the detected temperatures of objects to compress toward ambient temperature. In such conditions of high attenuation, values for sensed IR temperatures are clustered around the ambient temperature, and the range of even the lowest resolution channel may be limited to as little as a few degrees Celsius.

For other conditions and larger ranges of temperature, however, centering the channels symmetrically about ambient is not optimal, mainly because the distribution of temperatures of sensed objects above and below ambient are not symmetrical. Looking on the cold side, there are only about 300 degrees Celsius below room temperature, and there are usually not many objects with temperatures below minus 40 degrees C., for example. On the hot side above ambient, though, there may be a variety of hot objects of varying temperatures that are of interest, especially in the military context, e.g., hot engines, warm metal parts, burning objects, etc. The detected temperatures of these objects can range in temperature from ambient to thousands of degrees. To make optimal use of the data bits available in the channels, it is better to extend the range more above ambient than below, to get some resolution on these hotter objects. At the same time, however, each channel's range should encompass the ambient temperature, due to the number of objects that are found at or near ambient temperature.

It is also sometimes a consideration that the specific FLIR system being simulated may have hardware characteristics that resist centering data channels about ambient. Specifically, some FLIR sensors have a limited range of temperature output, e.g., 100 degrees C., and this may be limited by the hardware to a set range, irrespective of ambient temperature.

Optimal ranges of data around ambient temperature therefore vary according to circumstances. Generally, insofar as resolution goes, a low resolution channel will have an LSB of one-half degree or more, and the high resolution channel will have an LSB of a tenth of a degree Celsius or lower. However, this is all subject to adjustment for atmospheric conditions.

To keep the high-resolution channel centered on the distribution of data values therein, the output may be sampled and averaged, and this average fed back to the image generator to adjust the position of the center of the channel window. A more sophisticated alternate design is to average, and also to prepare a histogram of the output. The range and offset of the channels can be then be optimized dynamically based on the histogram to fit the immediate scene conditions.

Referring to FIG. 1, transmission of the data on the three channels also requires that scaling data be transmitted therewith to define the minimum and maximum values of the range of the data values for the channel so that actual values of the data stored in the pixel bit sets can be derived from the data transmitted via the high, medium and low resolution channels. To this end, scaling data is transmitted to the combiner circuit over additional data line 7 together with the video output on output line 5. The scaling data is generally two numbers, either a minimum value and a maximum value for the range of the channel, or a magnitude of the range and an offset defining a midpoint or lower end of the range of the channel. Using either of these two sets of numbers, the LSB and the value of the lower end of the channel range can be determined. The LSB and the lower end of the channel range can be used together with the value of the digital data stored in the associated bit set in the channel to derive a scaled value, such as, in the case of a FLIR simulation, an apparent temperature value.

Alternatively, the scaling data may be transmitted to the combiner in the video signal with the channels of data, or also the scale may be a preset constant of the system. Preferably however, the scaling data is variable, and is refreshed from frame to frame, as is desirable.

Figure 3:
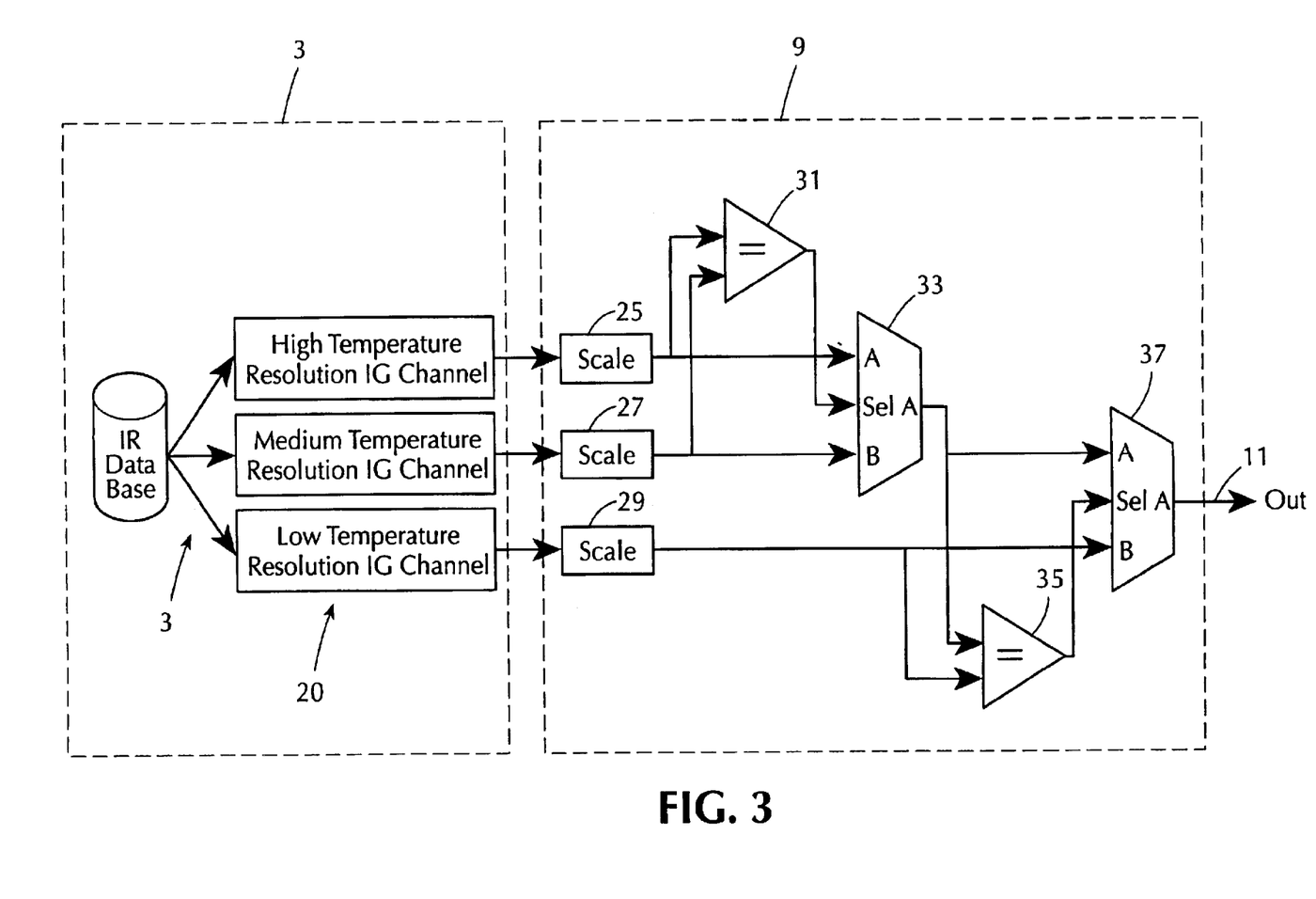
FIG. 3 a more detailed schematic diagram showing processing of the multiple channel video signal in the combiner circuitry of the preferred embodiment.

The video signal output to the combiner circuitry 9 is subjected to further processing wherein each pixel of the three data channels is analyzed and the best data in the three channels is passed through for post-processing and display to the user. The preferred embodiment for this operation is best shown in FIG. 3.

As has been discussed above, the infrared data base, i.e., the image generator programmed to produce the video signal, outputs the high, medium and low resolution data channels together on output 5. The three channels are received by the combiner circuitry and for each pixel of the video signal, the scaling data is applied to derive from the bit set of each channel a scaled data value for the pixel, such as, e.g., by the calculation scaled_data_value=$LSB$*(data_value)+(range_minimum_value)

This scaling function is performed by the hardware by scaling components 25, 27 and 29 to yield scaled data values.

To select the best of these data values for display, the combiner circuitry first compares the data value from the high resolution channel with the data from the middle resolution channel at comparator 31, which has a positive output if the two scaled data values do not differ by more than the LSB for the medium resolution channel, or some other user-specified tolerance, e.g., 1.5 or 2 times the LSB. If the values are equal to each other within this resolution tolerance, the positive output of the comparator 31 opens switch relay 33 to select the high resolution value for further analysis. If however there is too large a difference between the high and medium resolution values, this indicates that the value in the high resolution channel has clamped, overflowed, encountered some other bit limitation during generation and output of the video signal. If that is the case, the comparator 31 has a zero output, and switch relay 33 passes the medium resolution value on for further processing, dropping the clamped and less accurate high resolution value.

The output of the comparison of the high and medium channel data is then compared with the scaled data value from the low resolution channel at comparator 35. If the values do not differ by more than the LSB for the low resolution channel, or some other user-specified tolerance, e.g., 1.5 or 2 times the LSB, the comparator 35 has a positive output, which switches relay 37 to pass the result of the comparison of the high and medium resolution channels through as the best data value for the pixel. If the values differ by more than the low resolution tolerance, then the medium resolution channel value is also clamped, and the relay 37 passes the low resolution value through as the best value for display, dropping the clamped medium resolution value as less accurate. The result of this process is the selected scaled data value for the pixel, which is transmitted along line 11 to the post-processor 13.

The selected scaled data values constitute a stream of data organized as pixels in a display field. However, as these are scaled values derived in the combiner circuitry and not in the software of the image generator, they are not limited in size to the 8 bits of the RGB video output channels 5. Rather, the scaled data value for each pixel of the field of view may be a larger number of bits, e.g., 20 bits, which provides a high resolution pixel data stream to pass on to post-processing.

Referring to FIG. 1, in the high fidelity system of the preferred embodiment, the selected scaled data stream is sent to the post-processor 13 where it is prepared for display on visual display device 17. One aspect of this preparation is applying the gain selected by the user via the gain control 15 to the selected data stream. Since there are a large number of bits in for each pixel, this application of gain is effectively without adverse effects, e.g., there are no quantization effects or other problems caused by values limited by a restrictive number of bits defining the data values. Also, if necessary for the display device 17, the pixel array of data values may be resized to match the pixel array dimensions of the display device.

The display 17 is preferably a monochrome screen and the selected data values are displayed as monochrome intensities thereon, with adjustments based on the gain control 15 and re-sizing of the pixel field if necessary. Alternatively, however, the display may be a color display and the post-processor (or, in the case of a low fidelity system without a post-processor, the combiner circuitry) may convert the intensity values into corresponding colors, such as in an infrared display, with, for example, red pixels indicating hotter objects and blue representing cooler ones, or various other color separation methods to improve visual differentiation of objects of different temperatures.

While three channels are used in the preferred embodiment, it should be understood that a larger number of channels might be used, representing many different levels of resolution. It also is possible to produce a simpler system with some similar benefits to the system described above using only two channels of digital video data.

Another alternative embodiment is based on limiting image processing to one channel per object in the field of view so that the only valid output, i.e., the only output to be used in display, is through one single specified temperature range channel (high, medium, low, etc.). The channel is specified based on the object, such as for example, when an object has a very high temperature in a FLIR system, such as e.g. 10,000 degrees C., there is little interest in any resolution of this object other than low resolution. It therefore may be tagged as a low resolution object in the scene database of the IG, and this selection of low resolution may be specified so the combiner circuitry relies only on the specified channel. Similarly, some objects may require high resolution for some viewability reason, and these objects may carry a tag selecting high resolution for display. When the one channel is selected, other type objects may use one of the other channels, but only one of the channels can contain the intensity values to be used for the data display for each object. At the output of the image generator, the intensity data video stream lacks information on the object type (i.e., if it is a type with a specified resolution channel), which makes it somewhat more difficult for the combiner to determine which intensity value is the correct one to select from the several channel outputs. To facilitate this selection, the object intensities for each object are modified for that object's unused channels, while the intensity for that object going to its selected channel is left untouched.

The modified intensity has to be one that will make it all the way through the image generator processing with a determinate result that is independent of range. There is only one such intensity, the fading intensity, i.e., the intensity of ambient for a simulated FLIR, with no texture. The comparator at the output of the image generator must then look for any channel output that is non-ambient as its selection criteria to send it on to the output. If all channels end up with the fading intensity coming out due to the large distance of an object, it is a non-event, and in general the highest temperature resolution channel would be selected. The front end process of replacing the unused channel intensities with ambient can be done off line or in real time.

Figure 4:
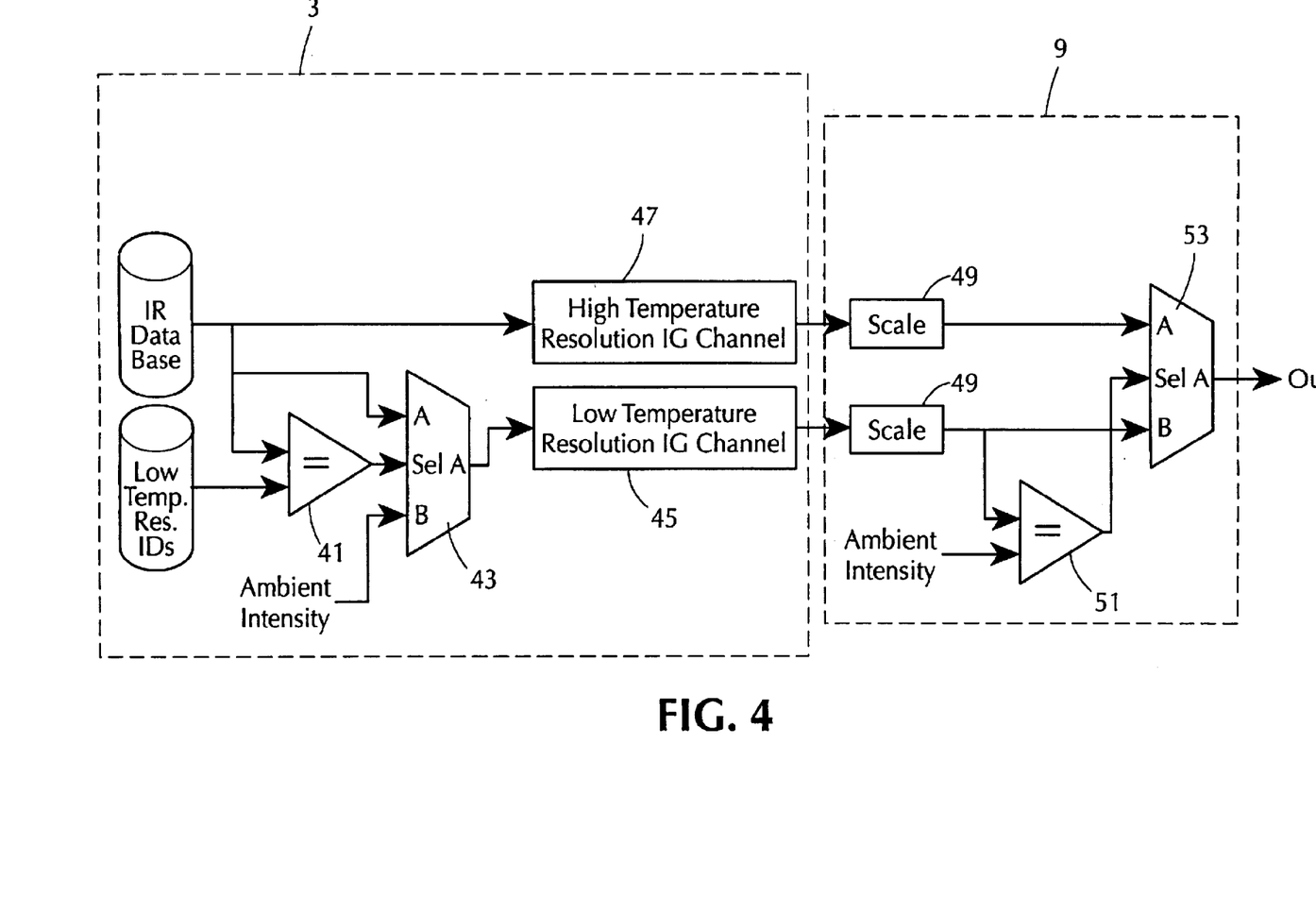
FIG. 4 is a schematic diagram of an alternate embodiment of combiner circuit.

One possible combiner circuit for such a system in a FLIR simulation is shown in FIG. 4. This system supports two channels, but can be expanded to as many channels as required. Because FIG. 4 shows only two channels, some simplification in the selection circuitry is possible.

In the image generator 3, when an object is struck by a trace for a pixel of the sensor field of view, the object is compared by a software comparison 41 (illustrated in a functional electronic way in FIG. 4) with a database 39 of objects in the scene for which low resolution data is desired. If there is a match, then, the low resolution channel is desired, and the software relay 43 switches to pass through the low resolution data value, schematically illustrated as being supplied to input A. This value is passed through to the low resolution image generation channel 45 for fading, etc., and on to be output as part of a multi channel video signal to combiner 9, as discussed above with regard to the preferred embodiment. At the same time similar data is passed through the high resolution image generator channel 47 and output with the video output signal.

In the combiner 9, both channels are scaled by scaling circuitry 49, and the low resolution channel is compared by comparator 51 with the value of ambient intensity, which is transmitted as a signal to the combiner 9 from the image generator 3 over the same connection as is used to send the scaling data.

If the low resolution channel is at some value other than ambient, it is selected as the output value by relay 53.

In the case where ambient is detected in the low resolution channel, then the high resolution channel is selected at relay 53. This means that it is necessary only to make the ambient substitution as required in the low resolution channel. The high resolution channel can be sent all unmodified intensities even for those objects that are identified for the low-resolution channel processing.

A combination of these two combiner systems may also be useful where high and medium temperature resolutions objects are processed as in the first implementation and that output is combined with the extremely hot or cold objects using the second implementation.

It will be understood that the invention herein extends well beyond the embodiments of the disclosure, and the terms used in this specification should be understood to be language of description, not limitation, as those of skill in the art with this specification before them will be able to make changes and modifications therein without departing from the scope of the invention.

What is claimed is:

1. A system for displaying a field of view representing values of a simulated data variable, said system comprising:
  an image generator comprising a computer having an output and transmitting thereon a video signal comprising at least two simulation generated digital data channels; and
  a display system connected with the output of the image generator and receiving said channels of digital data therefrom;

said display system including a combiner circuit receiving and processing the channels of data;

said display system further having a visual display device connected with the combiner circuit and displaying video imagery derived from said video signal in a field of pixels so as to be viewable by a user;

said digital data channels of the video signal from the image generator each comprising a plurality of bit sets each corresponding to a respective location in the field of view and having a preset number of bits of digital data therein;

the bit sets of the first channel each representing a respective value of the simulated data variable at a first resolution, and the bit sets of the second channel each representing a respective value of the simulated data variable at a second resolution higher than the first resolution.

2. The system according to claim 1, wherein the video signal comprises three digital data channels, and the third digital data channel comprises a plurality of bit sots each corresponding to a respective location in the field of view and having a preset number of bits of digital data therein;

the bit sets of the third channel each representing a respective value of the data variable at a third resolution that is higher than both said first and second resolutions.

3. The system according to claim 2, wherein the three channels are the red, green and blue data channels of a video output of the image generator.

4. The system according to claim 1, wherein the resolution of each channel is determined by a respective range of corresponding values of the data variable being displayed.

5. The system according to claim 4, wherein the image generator transmits scale values defining said ranges to the display system.

6. The system according to claim 1, wherein the image generator calculates values of the data variable for the locations of the field of view.

7. The system according to claim 6, wherein, after calculation of the values of the data variable, each of the values are stored in two respective data fields in computer-accessible memory of the image generator, said data fields each being part of a respective area storing values of the data variable at respective resolutions, the associated value being scaled by respective scaling parameters for the respective resolutions.

8. The system according to claim 7, wherein the image processor performs additional calculations on said stored values in the scaled form to simulate aspects of viewing of the field of view based on stored parameters defining conditions of viewing.

9. The system according to claim 7, wherein the image generator calculates values of the data variable by determining from scene data stored therein a parameter of a simulated object that is sensed through one of said locations in the field of view and determining the value of the data variable to be displayed for said location in the field of view based on said parameter.

10. The system according to claim 9, wherein the image generator calculates the values using a mathematical model of radiance of simulated objects that are determined to be in view in the field of view.

11. The system according to claim 1, wherein the locations of the field of view each correspond to a respective pixel of the display device.

12. The system according to claim 11, wherein the bit sets are each a set of eight bits.

13. The system according to claim 1, wherein the data variable is simulated infra-red sensor data generated by the image generator.

14. The system according to claim 13, wherein each of the channels transmits values of the data variable that are for a respective range of infra-red temperatures, the ranges each having a respective midpoint temperature, one of said midpoint temperatures being an ambient temperature for the simulation being presented to the user.

15. The system according to claim 1, wherein the bit sets are each a sot of eight bits.

16. The system according to claim 1, wherein the combiner circuit has scale parameters for each of the channels and derives for each bit set a scaled value of the data variable.

17. The system according to claim 16, wherein the scale parameters for each channel are transmitted from the image generator to the combiner circuitry with each new screen of the video signal.

18. The system according to claim 16, wherein the scale parameters each include a value defining a size of a range of data values in the channel, or minimum and maximum values of the range.

19. The system according to claim 18, wherein the scale parameters each further include a respective offset to compensate for different ranges of data values between the channels.

20. The system according to claim 1, wherein the visual display device is a monitor screen or a head mounted display.

21. The system according to claim 1, wherein the visual display device is a monochrome monitor.

22. The system according to claim 1, wherein the system further comprises a gain control simulation device adapted to be operated by the user, said gain control simulation device communicating with the display system so as to simulate therein adjustment of gain by the user.

23. A system for simulating a display of values of a data variable in a field of view, said system comprising;

an image generator comprising a computer having an output and transmitting thereon a video signal comprising at least two digital data channels; and a display system connected with the output of the image generator and receiving said channels of digital data therefrom;

said display system including a combiner circuit receiving and processing the channels of data;

said display system further having a visual display device connected with the combiner circuit and displaying video imagery derived from said video signal in a field of pixels for viewing by a user;

said digital data channels of the video signal from the image generator each comprising a plurality of bit sets each corresponding to a respective location in the field of view and having a preset number of bits of digital data therein;

the bit sets of the first channel each representing a respective value of the data variable at a first resolution, and the bit sets of the second channel each representing a respective value of the data variable at a second resolution higher than the first resolution; and wherein the combiner circuit compares a scaled value from each bit set in the first channel with a scaled value from the bit set of the other channel that corresponds to the same location in the field of view and selects based on said comparison a value to be transmitted to the visual display device.

24. The system according to claim 23, wherein the combiner circuit compares for each bit set a scaled value thereof and selects for the display device a one of said scaled values that is of highest unclamped resolution.

25. A system for simulation of a FLIR display, said system comprising
an image generator having an output and transmitting thereon a video signal comprising first, second and third digital video channels; and
a display system connected with the output of the image generator and receiving said video signal therefrom, said display system including a combiner circuit receiving and processing the channels of said video signal and producing therefrom an output signal, and a visual display device having a field of pixels viewable by a user of the system, said visual device receiving the output signal from the combiner circuit and displaying video imagery derived from said signal in said field of pixels for viewing by the user;
each of said channels comprising a plurality of 8-bit sets of pixel data, each of the 8-bit sets corresponding to a respective pixel of the visual display device;
the bit sots of the first channel each representing a respective scaled FLIR intensity value in a first range of intensity values that is between a first minimum corresponding temperature value and a first maximum corresponding temperature value, the first minimum corresponding temperature value being below an ambient temperature value of the simulation and the first maximum corresponding temperature value being above the ambient temperature value being simulated;
the bit sets of the second channel each representing a respective scaled FLIR intensity value in a second range of intensity values that is narrower than said first range, said second range being between a second corresponding minimum temperature value that is below the ambient temperature value and a second corresponding maximum temperature value that is above the ambient temperature value; and
the bit sets of the third channel each representing a respective scaled FLIT intensity value in a third range of intensity values that is narrower than said second range, said third range being between a third corresponding minimum temperature value that is below the ambient temperature value and a third corresponding maximum temperature value that is above the ambient temperature value;
the combiner circuit, for each pixel of the display device, converting the scaled value from each corresponding bit sot in each of the channels to a re-scaled value scaled to a common scale of intensity values that allows comparison of values derived from the channels;
said combiner circuit selecting as a selected scaled value for the pixel the scaled value from the first channel if all three scaled values for the pixel are different, selecting as the selected scaled value for the pixel the scaled value of the second channel if the scaled value of the second channel is equal to the scaled value of the first channel but different from scaled value of the third channel, and selecting as the selected scaled value for the pixel the scaled value of the third channel if all the scaled values for the pixel are different; and
a gain control configured to be adjusted by the user and operatively associated with the display system, the display system receiving from said gain control an electrical indication of a desired gain level to be applied to the display, said display system deriving the output signal for the pixel based on said desired gain level and the selected scaled value.

26. The system of claim 25 wherein the third range has a midpoint at the ambient temperature.

27. The system of claim 25 wherein the display system includes a post processor circuit that receives the selected scaled data from the combiner circuit and the gain control and adjusts the displayed data based thereon to simulate a gain level specified by the gain control.

28. A method of simulating a sensor system that displays values of a data variable representing a sensed radiation level over a field of view, said method comprising:
determining in an image generator, for each of a group of locations in the field of view, a respective data value for the data variable based on a database of scene data in the image generator and on a mathematical model determining radiation from simulated objects based on defined parameters thereof,
storing said data values in two groups of data fields in memory of the image generator, each of said data fields being a field of n bits and corresponding to a respective location in the field of view, each of the groups of data fields having associated therewith scaling parameters that define a respective resolution thereof and a range of radiation values that correspond to scaled values stored therein, said data values being stored in said data fields of the group of data fields in a form of n bits and derived by scaling said data values based on the respective scaling parameters of the group of the data field,
outputting from the image processor a video output signal having at least two channels, each of said channels containing the data values of a respective group of data fields in the respective resolution,
receiving said video output and scaling parameters in a display system,
scaling the scaled data values to a common scale that allows comparison of values from one channel to values from the other channel,
selecting a value from said data values on the common scale based on an assessment of the data being less likely to have been clamped in value by a range of a channel, and
displaying the selected data value as an intensity on a display device.

29. The method of claim 28 wherein the data variable is infrared radiation intensity, and the determination thereof is based on store parameters for objects viewed that include material of the simulated object and the mathematical model used is a thermal motel.

30. The method of claim 28, wherein after storing, the data values are subjected to further modification based on calculations using parameters defining viewing conditions and distance from the object identified to the sensor being simulated.

31. The method of claim 28, wherein the value of n is eight (8).

32. The method of claim 28, wherein the video output has a third channel of data that represents the data values for the locations at a third resolution.

33. The method of claim 28, and further comprising modifying the value of the selected data value based on an input gain level entered by a user on a simulator gain control device.

34. A system for displaying a field of view to a user, said system comprising:

a computerized image generator having an output configured to transmit a video signal having two or more video channels;

said image generator formulating a group of data values, each data value corresponding to a respective location in the field of view;

said image generator deriving from said data values first and second digital data signals and transmitting said first and second data signals as two video channels via said output;

said first and second data signals each including at least one screen image comprising a number of sets of bits each corresponding to a respective location in said field of view;

each set of bits defining a numerical value expressing the data value corresponding to said location in the field of view scaled relative to a respective range of possible data values separated by a respective incremental resolution step value for said range;

wherein the sets of bits of the screen image or images of the first data signal are all determined for a first range with a first resolution step value, and the sets of bits of the screen image or images of the second data signal are all determined for a second range with a second resolution step value that is smaller than said first resolution step value.

35. The system according to claim 34, and further comprising a display system connected with the output and receiving the video channels therefrom and displaying video imagery derived from at least one of said data signals so as to be viewed by the user.

36. The system according to claim 35, wherein said display system includes a display apparatus displaying a field of pixels, and wherein said locations in the field of view each correspond to a respective one of said pixels of said display apparatus, at least one of said sets of bits being used by said display system to set an illumination level and/or color for the associated pixel of the display apparatus.

37. The system according to claim 36, wherein said sets of bits are each a set of eight bits.

38. The system according to claim 37, wherein said first and second ranges each have a total range value between a maximum possible data value and a minimum possible data value, and said incremental resolution step value is 1/255 of the total range value.

39. The system according to claim 35, wherein said image generator transmits scale data related to the ranges and stop values of the data signals to the display system, and said display system uses said scale data to prepare the video imagery displayed to the user.

40. The system according to claim 34, wherein said image generator derives from said set of data values a third digital data signal and transmits said third data signal with said first and second data signals as three video channels via said output;

said third data signal including at least one screen image comprising a number of sets of bits each corresponding to a respective location in said field of view, each set of bits defining a numerical value expressing the data value corresponding to said location in the field of view scaled relative to a third range of possible data values separated by a third incremental resolution step value for said range that is different from said first and second resolution step values.

41. The system according to claim 40 wherein said three channels of said data signals are transmitted via said output as an RGB video output.

42. The system according to claim 41, and further comprising a display system connected with the output and receiving RGB video output therefrom, and selecting and displaying one of said channels so as to be viewed by a user.

43. The system according to claim 34, wherein said image generator formulates said data values corresponding to a respective location in a field of view using scene data defining objects to be simulated in said field of view.

44. The system according to claim 43, wherein said magic generator formulates the data values to simulate an infra-red image of said field of view.

45. The system according to claim 44, wherein said scene data includes temperature data for said objects to be simulated in said field of view and said formulation includes determining based on said temperature data an appropriate data value for an infra-red view of said objects.

46. The system according to claim 44, and further comprising a display system connected with the output and receiving the video channels therefrom, said display system having a simulated FLIR screen display apparatus and displaying the screen images of one of said data signals on said simulated FLIR screen display apparatus so as to be viewed by a user.

47. The system according to claim 35, wherein the data values are time-varying values formulated by the image generator so that said first and second data signals each comprise a stream of said screen images so that the video imagery displayed to the user is displayed as a real-time video.

* * * * *